United States Patent [19]

Misawa et al.

[11] Patent Number: 5,446,135

[45] Date of Patent: Aug. 29, 1995

[54] SULFONYLOXY SUBSTITUTED TRIS-AZOARYL DYES AND COPPER COMPLEX SALTS THEREOF AND POLARIZING FILMS DYED THEREWITH

[75] Inventors: Tsutami Misawa; Akira Ogiso, both of Yokohama; Rihoko Imai, Tokyo; Hisato Itoh, Yokohama, all of Japan

[73] Assignee: Mitsui Toatsu Chemicals, Inc., Tokyo, Japan

[21] Appl. No.: 212,747

[22] Filed: Mar. 14, 1994

Related U.S. Application Data

[62] Division of Ser. No. 996,814, Dec. 24, 1992, Pat. No. 5,318,856.

[30] Foreign Application Priority Data

Dec. 26, 1991 [JP] Japan .................. 3-344656
Dec. 26, 1991 [JP] Japan .................. 3-344657
Dec. 27, 1991 [JP] Japan .................. 3-345907
Dec. 27, 1991 [JP] Japan .................. 3-345908

[51] Int. Cl.6 .................. C09B 31/16; C09B 45/28
[52] U.S. Cl. ............................. 534/714; 534/811; 534/815; 534/581; 534/602; 534/887
[58] Field of Search .............. 534/714, 811, 815; 8/506, 681

[56] References Cited

U.S. PATENT DOCUMENTS

| | | | |
|---|---|---|---|
| 1,913,382 | 6/1933 | Gubelmann et al. | 534/811 |
| 1,913,384 | 6/1933 | Gubelmann et al. | 534/815 X |
| 2,982,764 | 5/1961 | Bitterlin et al. | 534/714 |
| 4,841,037 | 6/1989 | Ohta et al. | 534/815 |
| 5,256,194 | 10/1993 | Nishiwaki et al. | 534/815 X |

FOREIGN PATENT DOCUMENTS 1-313568 12/1989 Japan .
01313568 2/1990 Japan .
3-12606 1/1991 Japan .
03012606 3/1991 Japan .

OTHER PUBLICATIONS

Suzuki et al., Chemical Abstracts, 116:95274t (1992).
Kotani et al., Chemical Abstracts, 115:38339y (1991).
Sumiya et al., Chemical Abstracts, 112:218407r (1990).

*Primary Examiner*—Robert Gerstl
*Assistant Examiner*—Fiona T. Powers
*Attorney, Agent, or Firm*—Millen, White, Zelano & Branigan

[57] ABSTRACT

Dyes having the specific structural formula (1) set out below, their copper salt dyes, water-soluble azo dyes containing the dyes or the copper salt dyes, and polarizing films containing the water-soluble azo dyes:

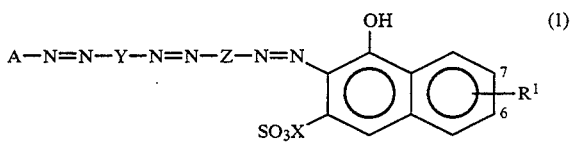

wherein A means a benzene or naphthalene ring having a sulfone group or a base thereof, Y and Z individually denote a group of the following formula (a);

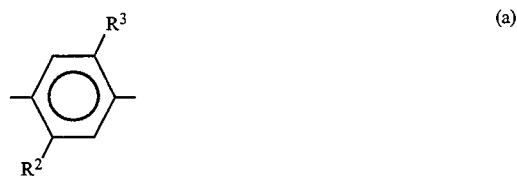

wherein $R^2$ is a hydrogen atom, a methyl group, a methoxyl group or an ethoxyl group and $R^3$ is a methyl, methoxyl or ethoxyl group, $R^1$ represents an amino, $C_{1-4}$ alkylamino, $C_{2-4}$ alkylcarboxyamino, benzoylamino or phenylamino group bonded to the 6 or 7 position of the naphthalene ring, and X denotes a hydrogen, sodium, potassium or lithium atom, with the proviso that Y and Z are different but, when both $R^2$s are hydrogen atoms and both $R^3$s are methoxyl groups, Y and Z may be the same.

17 Claims, No Drawings

SULFONYLOXY SUBSTITUTED TRIS-AZOARYL DYES AND COPPER COMPLEX SALTS THEREOF AND POLARIZING FILMS DYED THEREWITH

This is a division, of application Ser. No. 07/996,814 filed Dec. 24, 1992 now U.S. Pat. No. 5,318,856.

BACKGROUND OF THE INVENTION

1. Field of the Invention

This invention relates to novel azo dyes and copper complex salts thereof, to water-soluble dye compositions containing them and to polarizing films containing an azo dye or copper complex salt dye of this invention adsorbed and oriented thereon as dichroic dyestuff and having high durability and a high polarization degree.

2. Description of the Related Art

It is now the common practice to produce a polarizing film by stretching a film of polyvinyl alcohol (PVA) or a derivative thereof or of a polyene and then causing iodine or a dichroic dye to be adsorbed as a polarizing element on the resulting oriented film.

Among such polarizing films, those making use of iodine as a polarizing element are excellent in initial polarizing performance but have poor resistance to water or heat. They are hence accompanied by a problem in durability when employed over a long period of time under high temperature and humidity conditions. To improve their durability, it is contemplated, for example, to enhance their treatment in an aqueous solution containing formaldehyde or boric acid or to use, as a protective film, a polymer film having low moisture permeability. Their durability is however still insufficient under high temperature and moisture conditions.

Polarizing films making use of a dichroic dye as a polarizing element have better durability against water and heat compared with polarizing films using iodine but are inferior in polarizing ability compared to the latter. With a view toward improving this drawback, polarizing films using an organic dye as a polarizing element with improved heat resistance and polarizing ability are proposed in Japanese Patent Laid-Open No. 313568/1989 [Chem. Absts. 112(24): 218407r] and Japanese Patent Laid-Open No. 12606/1991 [Chem. Absts. 115(4): 38339y]. When employed as polarizing films, such organic dyes are generally used in combination with a dye having absorption in a particular wavelength range to provide the polarizing films with a neutral color. It is therefore the current situation that depending on the dyes employed, such polarizing films may undergo a substantial color change at high temperatures.

SUMMARY OF THE INVENTION

An object of the present invention is to provide a dye-base polarizing film, and specifically to provide a high-quality polarizing film capable of exhibiting polarizing ability comparable with iodine-base polarizing films and, even when two or more dyes are used in combination to provide a neutral color, having excellent polarizing ability and heat resistance.

Another object of the present invention is to provide a novel azo dye for achieving the above object.

The present inventors have conducted extensive research with a view toward obtaining a polarizing film which uses a dye as a polarizing element and is excellent in polarizing ability and heat resistance, resulting in the completion of the present invention.

The present invention therefore provides:

1) an azo dye represented by the following formula (1):

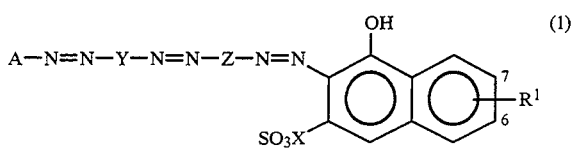

wherein A means a benzene or naphthalene ring having a sulfone group or a base thereof, Y and Z individually denote a group of the following formula (a):

wherein $R^2$ is a hydrogen atom, a methyl group, a methoxyl group or an ethoxyl group and $R^3$ is a methyl, methoxyl or ethoxyl group, $R^1$ represents an amino, $C_{1-4}$ alkylamino, $C_{2-4}$ alkylcarboxyamino, benzoylamino or phenylamino group bonded to the 6 or 7 position of the naphthalene ring, and X denotes a hydrogen, sodium, potassium or lithium atom, with the proviso that Y and Z are different but, when both $R^2$s are hydrogen atoms and both $R^3$s are methoxyl groups, Y and Z may be the same;

2) a copper complex salt dye represented by the following formula (7):

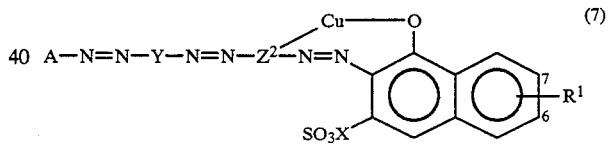

wherein A, X, Y and $R^1$ have the same meanings as defined above in the formula (1), and $Z^2$ is represented by the following formula (b):

wherein $R^2$ has the same meaning as defined above in the formula (a);

3) the water-soluble composition comprising the azo dye of the formula (1) or a copper complex salt dye of the formula (7); and 4) a polarizing film dyed with a water-soluble dye of this invention.

The polarizing film dyed using the water-soluble dye according to this invention has high heat resistance and high polarization degree and is therefore a polarizing film having excellent optical properties.

DETAILED DESCRIPTION OF THE PREFERRED EMBODIMENTS

As the azo dyes of the present invention represented by the formula (1), those represented by the following formulas (2) to (6) are particularly preferred:

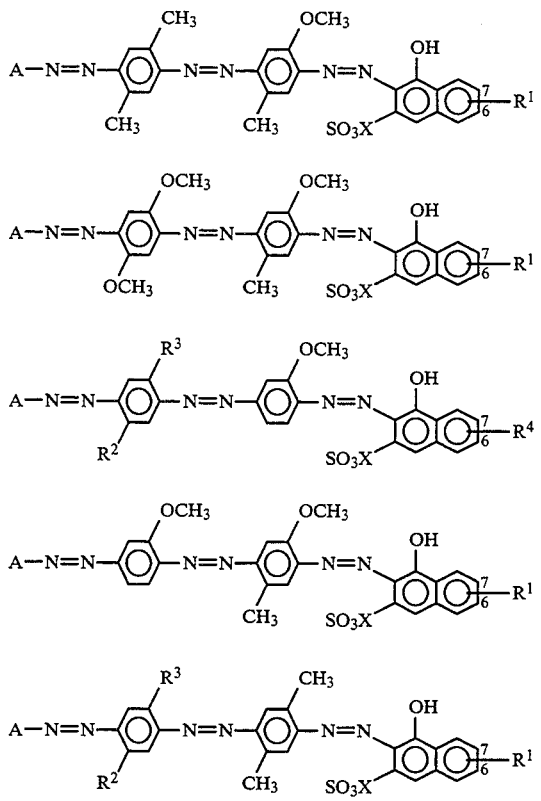

wherein A, X, $R^1$, $R^2$ and $R^3$ have the same meanings as defined in the formula (1), and $R^4$ represents an amino, methylamino, ethylamino, acetylamino, benzoylamino or phenylamino group bonded to the 6 or 7 position of the naphthalene ring.

As the copper complex salt dyes represented by the formula (7), those represented by the following formulas (8) to (11) are especially preferred:

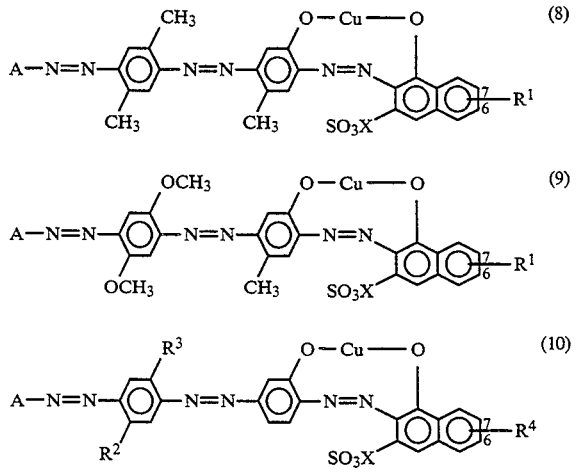

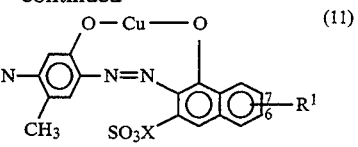

wherein A, X, $R^1$ $R^2$ and $R^3$ have the same meanings as defined in the formula (1), and $R^4$ represents an amino, methylamino, ethylamino, acetylamino, benzoylamino or phenylamino group bonded to the 6 or 7 position of the naphthalene ring.

The azo dyes of this invention represented by the formulas (1) to (6) can be prepared using a known diazotization process and coupling process like conventional azo dyes.

For example, an amino compound represented by the following formula (12):

$$A—NH_2 \qquad (12)$$

wherein A has the same meaning as defined above is diazotized, followed by the coupling with a compound represented by the following formula (13)

$$Y'—NH_2 \qquad (13)$$

wherein Y' means a group represented by the following formula (a'):

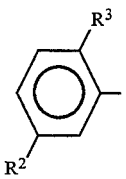

wherein $R^2$ and $R^3$ have the same meanings as defined above.

After the compound so obtained is diazotized again, the diazotized compound is coupled with a compound represented by the following formula (14):

$$Z'—NH_2 \qquad (14)$$

wherein Z' means a group represented by the formula (a') with the proviso that the combination of $R^2$ and $R^3$ may become the same as Y' only when $R^2$ is a hydrogen atom and $R^3$ is a methoxyl group, whereby a disazo compound represented by the following formula (15) is produced:

$$A—N{=}N—Y—N{=}N—Z—NH_2 \qquad (15)$$

wherein A, Y and Z have the same meanings as defined above. In the production processes of these intermediates, each diazotization can be carried out in a conventional manner wherein a nitrite such as sodium nitrite is mixed with an aqueous solution or suspension of the amine in a mineral acid such as hydrochloric acid or sulfuric acid or alternatively by a reverse process in which a nitrite is first added to a neutral to slightly alkaline, aqueous solution of the amine and the resulting mixture is mixed with a mineral acid. The diazotization temperature may suitably range from $-10°$ C. to $40°$ C.

The coupling can be conducted by simply mixing an acidic aqueous solution of the amine in hydrochloric acid or acetic acid with the above-described dis-azo solution and then adjusting the pH of the resultant mixture to 3–7. The coupling temperature may suitably range from −10° C. to 40° C.

The disazo compound so formed can then be subjected to the next diazotization step either as is, namely, in the form of a solution or suspension or after causing it to precipitate by acidification or salting out and then collecting same by filtration.

The azo dyes represented by the formulas (1) to (6) can then be obtained by diazotizing the disazo compound of the formula (15) and then coupling the resultant compound with a compound represented by the following formula (16):

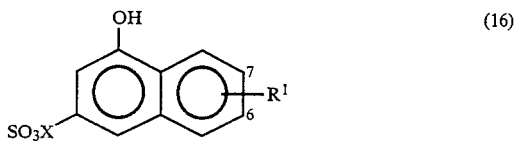 (16)

wherein $R^1$ and X have the same meanings as defined above.

The diazotization of the above dis-azo compound may be conducted in a conventional manner as in the above diazotization process but a reverse process is preferred when the dis-azo compound has very low solubility under an acidic condition. The diazotization temperature may suitably range from 0° C. to 40° C. The resulting reaction mixture is in the form of a suspension. This suspension can be used in the next coupling step either as is or after obtaining a presscake of the diazonium salt by filtration.

To conduct the coupling, the suspension or presscake of the diazonium salt is added in portions to an aqueous alkaline solution of the coupling component. Here, an alkali is added as needed to maintain the pH of the reaction mixture at 8 to 11. Usable preferred examples of the alkali include carbonates such as sodium, potassium and lithium carbonates, ammonia and amines such as mono-, di- or triethanolamine. In addition, the hydroxide or bicarbonate of sodium, potassium or the like can also be used in combination. Further, a usual coupling promoter such as pyridine or urea can also be added. The coupling temperature may suitably range from −10° C. to 40° C.

After the completion of the coupling, sodium chloride and/or potassium chloride is added as needed to achieve salting out, whereby a target azo dye of one of the formulas (1) to (6) are collected.

To obtain the copper complex salts of the water-soluble dyes, said salts being represented by the formula (7) to (11), a conventional process can be followed. Namely, a water-soluble dye of one of the formulas (1) to (5) is heated normally to 70°–100° C. together with a copper salt such as copper sulfate, copper chloride or copper acetate in an aqueous solution. At this time, ammonia, or an organic amine such as monoethanolamine, diethanolamine, monopropanolamine or pyridine can be added as needed.

Specific examples of the compound of the formula (12) as the raw material include sulfanilic acid, metanilic acid, aniline-2,4-disulfonic acid, aniline-2,5-disulfonic acid, 2-naphthylamine-6-sulfonic acid, 2-naphthylamine-4,8-disulfonic acid, 2-naphthylamine-3,6-disulfonic acid, 2-naphthylamine-5,7-disulfonic acid, 2-naphthylamine-6,8-disulfonic acid, and the like.

Specific examples of the compounds represented by the formula (13) or (14) include p-cresidine, 2,5-dimethoxyaniline, 2,5-diethoxyaniline, o-toluidine, p-xylidine, o-anisidine and the like.

Specific examples of the compound represented by the formula (16) include J acid (2-amino-5-naphthol-7-sulfonic acid), γacid (2-amino-8-naphthol-6-sulfonic acid), N-methyl J acid, N-ethyl J acid, N-propyl J acid, N-butyl J acid, N-methyl γacid, N-ethyl γacid, N-propyl γacid, N-butyl γacid, N-acetyl J acid, N-propionyl J acid, N-butyryl J acid, N-acetyl γacid, N-propionyl γacid, N-butyryl γacid, N-benzoyl J acid, N-benzoyl γacid, N-phenyl J acid and N-phenyl γacid, and the sodium, potassium and lithium salts thereof.

As the polymer film employed to produce the polarizing film of this invention, a hydrophilic polymer film is preferred. Specific examples of its material include polymers such as polyvinyl alcohol, polyvinyl formal, polyvinyl acetal and polyvinyl butyral; those obtained by modifying them with ethylene, propylene, acrylic acid, maleic acid, acrylamide or the like; and cellulose resins. These polymers are particularly useful in that they have high solubility in water or a hydrophilic organic solvent, good compatibility with the dyes of the present invention, excellent film-forming property and, when stretch-oriented subsequent to formation into films, and dyeing facilitate orientation of the dyes of the present invention.

As a process for producing the polarizing film of this invention using an above-described polymer and a dye of this invention, the polymer is formed into a film, followed by dyeing; or the dye of the present invention is added to a solution of the polymer to dye the polymer solution, followed by the formation of the dyed polymer solution into a film.

The above dyeing, film formation and stretching can be conducted generally in the following manner.

A polymer film is immersed at 20°–80° C., preferably 30°–50° C. for 1–60 minutes, preferably 3–20 minutes in a dye bath containing a dye according to this invention and, if necessary, inorganic salts such as sodium chloride and sodium sulfate, and dyeing assistants such as surface-active agents, the concentration of said dye being 0.1–5 wt. %, preferably 0.8–2.5 wt. % based on the polymer film to be dyed, so that the polymer is dyed. The polymer film so dyed is treated with boric acid as needed, and is then dried.

As an alternative, the polymer is dissolved in water and/or a hydrophilic organic solvent such as an alcohol, glycerin or dimethylformamide, to which a dye according to the present invention is added to dye the polymer solution. The dyed polymer solution is formed into a film by solution casting, solution coating, extrusion or the like, whereby a dyed film is produced.

The concentration of the polymer dissolved in the solvent varies depending on the type of the polymer but may be 5–30 wt. %, preferably 10–20 wt. %. The concentration of the dye according to the present invention dissolved in the solvent also varies depending on the type of the polymer, the type of the dye, the thickness of the resulting film, properties required upon employment as a polarizing film, and the like but may generally be 0.1–5 wt. % with about 0.8–2.5 wt. % being preferred.

The unstretched film obtained by dyeing or film formation as described above is stretched in a uniaxially by a suitable method. By this stretching, dye molecules are oriented to develop polarizing ability. Uniaxial stretching methods include wet draw stretching, dry draw stretching, dry inter-roll compression stretching, etc. The stretching can be conducted by any of such methods. Although it is preferred to conduct this stretching at a draw ratio in a range of from 2 times to 9 times, a range of from 2.5 times to 6 times is preferred when polyvinyl alcohol or a derivative thereof is used.

After the stretching and orientation, boric acid treatment is applied in order to improve the water-proofness and polarizing ability of the stretched film, By this boric acid treatment, both the light transmittance and the polarity of the film are improved. Regarding the conditions for the boric acid treatment, the boric acid concentration is generally 1–15 wt. %, preferably 3–10 wt. % and the treatment temperature may desirably be in the range of 30°–80° C., preferably 40°–80° C. The treatment cannot bring about sufficient effects when the concentration of boric acid is lower than 1 wt. % or the temperature is lower than 30° C. When the concentration of boric acid is higher than 15 wt. % or the temperature exceeds 80° C., the resulting polarizing film will be brittle. Boric acid concentrations and treatment temperatures outside their respective ranges described above are therefore not preferred.

The azo dyes represented by the formulas (1) to (6) and their copper complex salt dyes represented by the formulas (7) to (11) can be used either singly or in combination. Moreover, combinations of one or more other dyes with the dyes of the present invention make it possible to produce polarizing films dyed in various hues. When such other dyes are combined, any dyes can be used as such other dyes as long as they have characteristic absorption in a wavelength range different from those of the dyes of the present invention and are provided with a high degree of dichroism. The followings are examples of particularly preferred dyes as expressed in terms of color index (C.I.) generic names:

C.I. Direct Yellow 12, C.I. Direct Red 2,
C.I. Direct Yellow 44, C.I. Direct Red 79,
C.I. Direct Yellow 28, C.I. Direct Red 81,
C.I. Direct Yellow 142, C.I. Direct Red 247,
C.I. Direct Violet 9, C.I. Direct Blue 1,
C.I. Direct Violet 51, C.I. Direct Blue 71 C.I. Direct Blue 78,
C.I. Direct Orange 26, C.I. Direct Blue 168,
C.I. Direct Orange 39, C.I. Direct Blue 202,
C.I. Direct Orange 107,
C.I. Direct Brown 106, C.I. Direct Green 85,
C.I. Direct Brown 223.

When water-soluble dyes or their copper complex salt dyes represented by the formulas (1) to (11) are employed as components for neutral colors which are used particularly widely, polarizing films capable of exhibiting superb polarizing properties and preferred absorption characteristics can be obtained. Moreover, their moisture resistance are excellent.

The polarizing films produced as described above can be used by applying various processing thereto. For example, they can be formed as films or sheets and can be used as they are. Depending on application purposes, they can be laminated with a polymer such as a triacetate, acrylic or urethane polymer to form protective layers thereon. Further, transparent conductive films of indium-tin oxides or the like can be formed for actual applications on the surfaces of the polarizing films by a vacuum depositing, sputtering or coating process.

The present invention will hereinafter be described by specific examples. It is to be noted that these examples are merely illustrative and are not intended to limit the present invention thereto.

The term "polarization degree" as used herein is a value measured by the following method. Namely, two polarizing films were placed in the optical path of a spectrophotometer with their stretched directions extending in parallel with each other. Based on the light transmittance (T//) so measured at the maximum absorption wavelength in the visible range and the light transmittance (T⊥) at the same wavelength as measured by superposing the two polarizing films with their stretched directions extending at a right angle, the polarization degree (V) was calculated using the following formula:

$$V = \sqrt{\frac{T// - T\perp}{T// + T\perp}} \times 100(\%)$$

Further, the durability in the present invention is expressed by $\Delta E^*$ which is to be defined below. Namely, the light transmittance of a polarizing film was measured. Its $L^*$, $a^*$ and $b^*$ values were calculated in accordance with the method prescribed in the Japanese Industrial Standard (JIS), Z8729 (Method for Specification of Non-Luminous Objects by the $L^*,a^*,b^*$ color system and the $L^*,u^*,v^*$ color system). $\Delta E^*$ is a value obtained in accordance with the following formula:

$$(\Delta E^*)_{i,j} = \sqrt{((\Delta L^*)_{i,j})^2 + ((\Delta a^*)_{i,j})^2 + ((\Delta b^*)_{i,j})^2}$$

where,
$(\Delta L^*)_{i,j} = (L^*)_i - (L^*)^*_j$ $(\Delta a^*)_{i,j} = (a^*)_i - (a^*)^*_j$ $(\Delta b^*)_{i,j} = (b^*)_i - (b^*)^*_j$ i: before durability test j: after durability test $\Delta E^*$ values greater than 1 indicate a noticeable color change compared with the color in the initial stage and hence pose a problem from the standpoint of stability in quality.

Incidentally, all designations of "part" or "parts" in the examples indicate part or parts by weight.

EXAMPLE 1

Sodium 2,5-dimethyl-4-aminoazobenzene-4'-sulfonate (32.7 parts; 0.1 mole) was dissolved in 330 parts of water, followed by the addition of 31 parts of concentrated hydrochloric acid and 6.9 parts of sodium nitrite for diazotization. After a solution of 13.7 parts of p-cresidine in an aqueous solution of hydrochloric acid was added to the reaction mixture, sodium acetate was added to neutralize the resultant mixture to pH 4 so that coupling was effected. After the completion of the reaction, the reaction mixture was filtered whereby a presscake containing 44.3 parts of a dis-azo compound represented by the following formula was obtained.

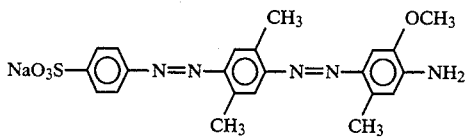

The presscake was dissolved in 2000 parts of warm water with neutralizing by sodium hydroxide, followed by the addition of 31 parts of concentrated hydrochloric acid and 6.9 parts of sodium nitrite for diazotization. After the completion of the diazotization, excess nitrite was decomposed by the addition of sulfamic acid, and the resulting suspension of the diazonium salt was then added dropwise at about 20° C. to a solution of 31.5 parts of N-phenyl J acid in a 10% aqueous solution of sodium carbonate so that coupling was effected. Subsequent to stirring for 2 hours, sodium chloride was added in a great excess to induce salting out. After the reaction mixture was stirred overnight, it was filtered, washed with a 3% aqueous solution of sodium chloride and then dried, whereby 73 parts of a tris-azo dye represented by the following formula (17) were obtained.

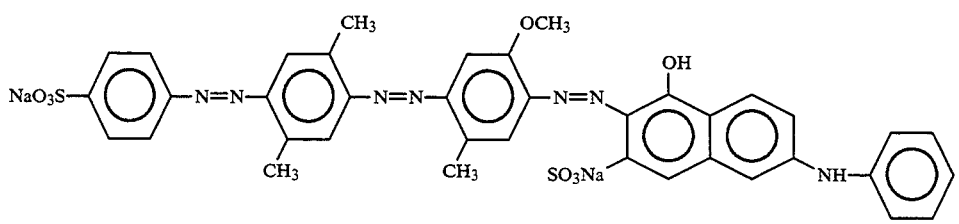

| Elemental analysis data: | C | H | N | S |
|---|---|---|---|---|
| Calculated (%) | 55.40 | 3.79 | 11.90 | 7.78 |
| Found (%) | 55.20 | 3.71 | 12.05 | 7.85 |

The dye of the formula (17) was formulated into a 0.3 g/l dye bath. The dye bath was maintained at 42° C., in which a polyvinyl alcohol film of 75 μm in thickness was immersed to dye it for 2 minutes. The film so dyed, which was still in a wet state, was stretched fivefold at 43° C. in a 3% aqueous solution of boric acid. In the stretched state, the film was rinsed with water and dried so that a polarizing film having a bluish purple color was produced. The polarization degree V of the polarizing film at its maximum absorption wavelength $\lambda_{max}$ was measured. As a result, the single-plate transmittance, $\lambda_{max}$ and V were found to be 43%, 575 nm and 99.0%, respectively.

A dye composition, which had been prepared by proportioning the dye of the formula (17), C.I. Direct Yellow 12, C.I. Direct Orange 39, C.I. Direct Red 81 and C.I. Direct Blue 202 at a ratio of 7:1:2:3:10, was formulated into a 0.2 g/l dye bath. The dye bath was maintained at 42° C., in which a polyvinyl alcohol film of 75 μm in thickness was immersed to dye it for 4 minutes. The film so dyed, which was still in a wet state, was stretched 5 times at 43° C. in a 3% aqueous solution of boric acid. In the stretched state, the film was rinsed with water and dried so that a polarizing film having a neutral color was produced. The polarization degree of the polarizing film at 40% single-plate transmittance was 98.5%.

$\Delta E^*$ of the polarizing film of the neutral color was 0.7 after it had been left over for 500 hours in a 100° C.-dry constant-temperature room.

EXAMPLE 2

In a similar manner to Example 1 except that 25.3 parts of N-methyl J acid were used instead of 31.5 parts of N-phenyl J acid, a tris-azo dye represented by the following formula (18) was obtained.

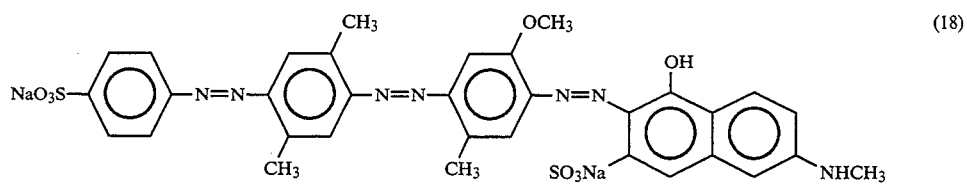

| Elemental analysis data: | C | H | N | S |
|---|---|---|---|---|
| Calculated (%) | 52.03 | 3.84 | 12.87 | 8.42 |
| Found (%) | 52.00 | 3.71 | 12.62 | 8.33 |

A polyvinyl alcohol film was treated in an aqueous solution of the dye of the formula (18) in a similar manner to Example 1, so that a polarizing film was produced. The film so obtained had a bluish purple color. The polarization degree V Of the polarizing film at its maximum absorption wavelength $\lambda_{max}$ was measured. As a result, the single-plate transmittance, $\lambda_{max}$ and V were found to be 43%, 575 nm and 97.5%, respectively.

In a similar manner to Example 1 except that the dye of the formula (18) was used instead of the dye of the formula (17), a polarizing film having a neutral color was produced. The polarization degree of the polarizing film at 40% single-plate transmittance was 98.0%.

$\Delta E^*$ of the polarizing film of the neutral color was 0.8 after it had been left over for 500 hours in a 100° C.-dry constant-temperature room.

EXAMPLE 3

2-Amino-4,8-naphthalenesulfonic acid (30.3 parts; 0.1 mole) was dissolved in 600 parts of water, followed by the addition of 31 parts of concentrated hydrochloric acid and 6.9 parts of sodium nitrite for diazotization. After the completion of the reaction, excess nitrite was decomposed by the addition of sulfamic acid, to which a solution of 12.2 parts of p-xylidine in an aqueous solution of hydrochloric acid was added. Then, sodium acetate was added at 15°–20° C. to neutralize the resultant mixture to pH 4 so that coupling was effected. After the completion of the reaction, precipitated crystals were collected by filtration, whereby 42.5 parts of a mono-azo compound represented by the following formula was obtained.

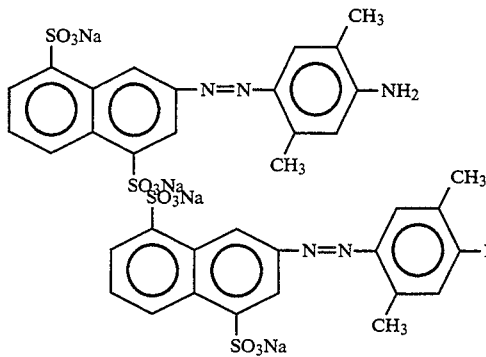

The mono-azo compound so obtained was neutralized with sodium hydroxide and dissolved in 500 parts of water, followed by the addition of 31 parts of concentrated hydrochloric acid and 6.9 parts of sodium nitrite for diazotization. After the completion of the diazotization, excess nitrite was decomposed by the addition of sulfamic acid. After a solution of 13.7 parts of p-cresidine in an aqueous solution of hydrochloric acid was added to the reaction mixture, sodium acetate was added at 15°–20° C. to neutralize the resultant mixture to pH 4 so that coupling was effected. After the completion of the reaction, the precipitated crystals were collected by filtration, whereby 56.1 parts of a dis-azo compound represented by the following formula were obtained.

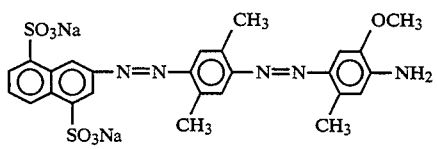

The dis-azo compound so obtained was thereafter neutralized with sodium hydroxide and dissolved in 2000 parts of wan water, followed by the addition of 31 parts of concentrated hydrochloric acid and 6.9 parts of sodium nitrite for diazotization. After the completion of the diazotization, excess nitrite was decomposed by the addition of sulfamic acid, and the resulting suspension of the diazonium salt was then added dropwise at about 20° C. to a solution of 31.5 parts of N-phenyl. J acid in a 10% aqueous solution of sodium carbonate so that coupling was effected. Subsequent to stirring for 2 hours, sodium chloride was added in a great excess to induce salting out. After the reaction mixture was stirred overnight, the reaction product was collected by filtration, washed with a 3% aqueous solution of sodium chloride and then dried, whereby 77 parts of a tris-azo dye represented by the following formula (19) were obtained.

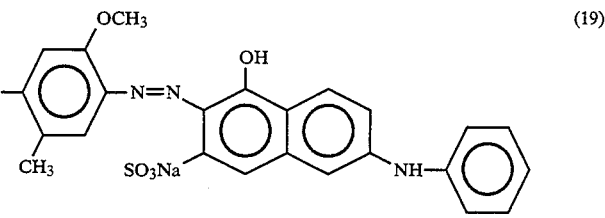

| Elemental analysis data: | C | H | N | S |
|---|---|---|---|---|
| Calculated (%) | 51.69 | 3.30 | 10.05 | 9.86 |
| Found (%) | 51.50 | 3.41 | 10.22 | 9.77 |

A polyvinyl alcohol film was treated in an aqueous solution of the dye of the formula (19) in a similar manner to Example 1, so that a polarizing film was produced. The film so obtained had a bluish purple color. The polarization degree V of the polarizing film at its maximum absorption wavelength $\lambda_{max}$ was measured. As a result, the single-plate transmittance, $\lambda_{max}$ and V were found to be 43%, 585 nm and 99%, respectively.

In a similar manner to Example 1 except that the dye of the formula (19) was used instead of the dye of the formula (17), a polarizing film having a neutral color was produced. The polarization degree of the polarizing film at 40% single-plate transmittance was 98.5%.

$\Delta E^*$ of the polarizing film of the neutral color was 0.7 after it had been left over for 500 hours in a 100° C.-dry constant-temperature room.

EXAMPLES 4–62

In a similar manner to Examples 1–3, dyes of the formula (1) shown in Table 1 were obtained. In the table, each hue, $\lambda_{max}$ and polarization degree are those observed or measured upon production of a polarizing film by the single use of the corresponding dye, while each $\Delta E^*$ is a value upon production of a polarizing film of a neutral color by the use of the corresponding dye instead of the dye of the formula (17) in Example 1.

TABLE 1

| Ex. | A | Y R² | Y R³ | Z R² | Z R³ | R¹ | Hue | λ_max (nm) | Single-plate transmittance (%) | Polarization degree (%) | ΔE* |
|---|---|---|---|---|---|---|---|---|---|---|---|
| 4 | HO₃S–⟨phenyl⟩ | CH₃ | CH₃ | CH₃ | OCH₃ | 6-NHCO–⟨phenyl⟩ | Reddish purple | 555 | 43 | 98.5 | 0.8 |
| 5 | " | H | OCH₃ | " | " | 6-NH–⟨phenyl⟩ | Bluish purple | 580 | " | 99.0 | 0.7 |
| 6 | " | " | " | " | " | 6-NHCH₃ | " | 580 | " | 97.5 | 0.8 |
| 7 | " | " | " | " | " | 6-NHCO–⟨phenyl⟩ | Reddish purple | 560 | " | 98.5 | 0.9 |
| 8 | HO₃S–⟨naphthyl⟩–SO₃H | " | " | " | " | 6-NH–⟨phenyl⟩ | Blue | 585 | " | 99.0 | 0.9 |
| 9 | HO₃S–⟨phenyl⟩ | OCH₃ | " | " | " | " | Bluish purple | 580 | " | 99.0 | 0.8 |
| 10 | HO₃S–⟨phenyl⟩ | OCH₃ | OCH₃ | CH₃ | OCH₃ | 6-NHCH₃ | Bluish purple | 580 | 43 | 97.5 | 0.9 |
| 11 | " | " | " | " | " | 6-NHCO–⟨phenyl⟩ | Reddish purple | 560 | " | 98.5 | 0.7 |

TABLE 1-continued
| Ex. | A | Y R² | Y R³ | Z R² | Z R³ | R¹ | Hue | $\lambda_{max}$ (nm) | Single-plate transmittance (%) | Polarization degree (%) | ΔE* |
|---|---|---|---|---|---|---|---|---|---|---|---|
| 12 | 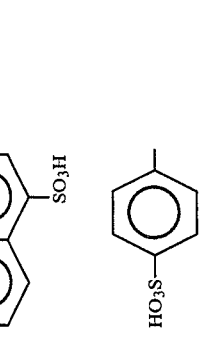 | " | " | " | " | 6-NH– | Blue | 585 | " | 99.0 | 0.8 |
| 13 |  | H | " | " | " | " | Bluish purple | 585 | " | 99.0 | 0.7 |
| 14 | " | " | " | " | " | 6-NHCH₃ | " | 585 | " | 97.5 | 0.8 |
| 15 | " | " | " | " | " | 6-NHCO–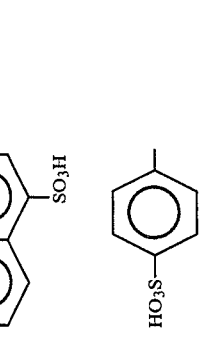 | Reddish purple | 565 | " | 98.5 | 0.8 |
| 16 | " | H | OCH₃ | H | OCH₃ | 6-NH– | Blue | 590 | 43 | 99.0 | 0.9 |
| 17 | " | CH₃ | " | CH₃ | CH₃ | " | Bluish purple | 585 | " | 99.0 | 0.9 |
| 18 | " | " | CH₃ | " | OCH₃ | 6-NH₂ | Bluish purple | 570 | " | 98.5 | 0.7 |
| 19 |  | " | " | " | " | 7-NHCH₃ | Blue | 585 | " | 99.0 | 0.7 |

TABLE 1-continued

| Ex. | A | Y R² | Y R³ | Z R² | Z R³ | R¹ | Hue | λmax (nm) | Single-plate transmittance (%) | Polarization degree (%) | ΔE* |
|---|---|---|---|---|---|---|---|---|---|---|---|
| 20 | (tolyl with SO₃H and HO₃S) | CH₃ | " | " | " | 6-NH–(phenyl) | Blue | 575 | " | 99.0 | 0.8 |
| 21 | (tolyl with HO₃S) | " | " | " | " | 7-NH₂ | Bluish purple | 590 | " | 97.5 | 0.8 |
| 22 | (methylnaphthalene with SO₃H and HO₃S) | CH₃ | CH₃ | CH₃ | OCH₃ | 6-NHCOCH₃ | Reddish purple | 560 | 43 | 98.5 | 0.9 |
| 23 | (naphthalene with SO₃H and HO₃S) | " | " | " | " | 7-NH–(phenyl) | Blue | 595 | " | 99.0 | 0.9 |
| 24 | (naphthalene with SO₃H and HO₃S) | " | " | " | " | 6-NHCH₃ | Blue | 585 | " | 99.0 | 0.8 |
| 25 | (naphthalene with HO₃S and SO₃H) | " | " | " | " | 6-NH–(phenyl) | Blue | 590 | " | 97.5 | 0.9 |
| 26 | (naphthalene with HO₃S and SO₃H) | " | " | " | " | 7-NHCOCH₃ | Bluish purple | 565 | " | 98.5 | 0.7 |

TABLE 1-continued

| Ex. | A | Y R² | R³ | Z R² | R³ | R¹ | Hue | λmax (nm) | Single-plate transmittance (%) | Polarization degree (%) | ΔE* |
|---|---|---|---|---|---|---|---|---|---|---|---|
| 27 | naphthalene with SO₃H, SO₃H | " | " | " | " | 6-NHC₂H₅ | Blue | 575 | " | 99.0 | 0.8 |
| 28 | benzene with SO₃H (m-toluenesulfonic) | H | OCH₃ | CH₃ | OCH₃ | 6-NH₂ | Bluish purple | 575 | 43 | 99.0 | 0.8 |
| 29 | benzene with SO₃H, HO₃S | " | " | " | " | 7-NHCH₃ | Blue | 590 | " | 98.5 | 0.6 |
| 30 | benzene with SO₃H, HO₃S | " | " | " | " | 6-NH—C₆H₅ | Blue | 580 | " | 99.0 | 0.7 |
| 31 | benzene with HO₃S | " | " | " | " | 7-NH₂ | Bluish purple | 595 | " | 99.0 | 0.9 |
| 32 | naphthalene with HO₃S, SO₃H | " | " | " | " | 6-NHCOCH₃ | Reddish purple | 565 | " | 97.5 | 0.8 |

TABLE 1-continued

| Ex. | A | Y R² | Y R³ | Z R² | Z R³ | Z R¹ | Hue | λ_max (nm) | Single-plate transmittance (%) | Polarization degree (%) | ΔE* |
|---|---|---|---|---|---|---|---|---|---|---|---|
| 33 | HO₃S-naphthalene | " | " | " | " | 7-NH-Ph | Blue | 600 | " | 98.5 | 0.9 |
| 34 | HO₃S-naphthalene-SO₃H | H | OCH₃ | CH₃ | OCH₃ | 6-NHCH₃ | Blue | 590 | 43 | 99.0 | 0.8 |
| 35 | HO₃S-naphthalene-SO₃H | " | " | " | " | 6-NH-Ph | Blue | 595 | " | 99.0 | 0.7 |
| 36 | HO₃S-naphthalene-SO₃H | " | " | " | " | 7-NHCOCH₃ | Bluish purple | 570 | " | 97.5 | 0.9 |
| 37 | HO₃S-naphthalene-SO₃H | " | " | " | " | 7-NHC₂H₅ | Blue | 580 | " | 98.5 | 0.7 |
| 38 | HO₃S-phenyl | OCH₃ | " | " | " | 6-NH₂ | Bluish purple | 575 | " | 99.0 | 0.8 |
| 39 | HO₃S-tolyl-SO₃H | " | " | " | " | 7-NHCH₃ | Blue | 590 | " | 99.0 | 0.9 |

TABLE 1-continued

| Ex. | A | Y R² | Y R³ | Z R² | Z R³ | R¹ | Hue | λ_max (nm) | Single-plate transmittance (%) | Polarization degree (%) | ΔE* |
|---|---|---|---|---|---|---|---|---|---|---|---|
| 40 | HO₃S—⌬—SO₃H (with CH₃) | OCH₃ | OCH₃ | CH₃ | OCH₃ | 6-NH—Ph | Blue | 580 | 43 | 98.5 | 0.8 |
| 41 | HO₃S—⌬ (with CH₃) | " | " | " | " | 7-NH₂ | Bluish purple | 595 | " | 99.0 | 0.7 |
| 42 | HO₃S—naphthalene—SO₃H | " | " | " | " | 6-NHCOCH₃ | Reddish purple | 565 | " | 99.0 | 0.9 |
| 43 | HO₃S—naphthalene | " | " | " | " | 7-NH—Ph | Blue | 600 | " | 97.5 | 0.8 |
| 44 | HO₃S—naphthalene—SO₃H | " | " | " | " | 6-NH—Ph | Blue | 595 | " | 98.5 | 0.7 |
| 45 | HO₃S—naphthalene—SO₃H | " | " | " | " | 6-NH—Ph | Bluish purple | 570 | " | 99.0 | 0.8 |

TABLE 1-continued

| Ex. | A | Y R² | Y R³ | Z R² | Z R³ | R¹ | Hue | λ_max (nm) | Single-plate transmittance (%) | Polarization degree (%) | ΔE* |
|---|---|---|---|---|---|---|---|---|---|---|---|
| 46 | naphthalene with SO₃H, SO₃H | OCH₃ | OCH₃ | CH₃ | OCH₃ | 6-NHC₂H₅ | Blue | 580 | 43 | 99.0 | 0.9 |
| 47 | benzene with SO₃H | CH₃ | " | H | " | 6-NH₂ | Blue | 575 | " | 97.5 | 0.8 |
| 48 | benzene with SO₃H, HO₃S | " | " | " | " | 7-NHCH₃ | Blue | 590 | " | 98.5 | 0.9 |
| 49 | benzene with SO₃H, HO₃S | " | CH₃ | " | " | 6-NH-C₆H₅ | Blue | 580 | " | 99.0 | 0.8 |
| 50 | benzene with HO₃S | " | " | " | " | 7-NH₂ | Bluish purple | 595 | " | 99.0 | 0.8 |
| 51 | naphthalene with SO₃H | OCH₃ | OCH₃ | " | " | 7-NHCOCH₃ | Reddish purple | 565 | " | 98.5 | 0.9 |

TABLE 1-continued

| Ex. | A | Y R² | Y R³ | Z R² | Z R³ | R¹ | Hue | λ_max (nm) | Single-plate transmittance (%) | Polarization degree (%) | ΔE* |
|---|---|---|---|---|---|---|---|---|---|---|---|
| 52 | naphthalene-HO₃S | OCH₃ | OCH₃ | H | OCH₃ | 7-NH-phenyl | Blue | 600 | 43 | 99.0 | 0.9 |
| 53 | naphthalene (SO₃H, HO₃S) | H | " | " | " | 6-NHCH₃ | Blue | 590 | " | 99.0 | 0.7 |
| 54 | naphthalene (HO₃S, SO₃H) | " | " | " | " | 6-NH-phenyl | Blue | 595 | " | 97.5 | 0.9 |
| 55 | naphthalene (SO₃H, HO₃S) | OC₂H₅ | OC₂H₅ | " | " | 7-NHCOCH₃ | Bluish purple | 570 | " | 98.5 | 0.8 |
| 56 | naphthalene (SO₃H, HO₃S) | " | " | " | " | 6-NHC₂H₅ | Blue | 580 | " | 99.0 | 0.9 |
| 57 | phenyl-CH₃, HO₃S | CH₃ | CH₃ | " | " | 6-NH-phenyl | Blue | 580 | " | 99.0 | 0.8 |
| 58 | naphthalene-CH₃ (SO₃H, HO₃S) | CH₃ | CH₃ | H | OCH₃ | 6-NH-phenyl | Blue | 585 | 43 | 97.5 | 0.8 |

TABLE 1-continued

| Ex. | A | Y R² | Y R³ | Z R² | Z R³ | R¹ | Hue | $\lambda_{max}$ (nm) | Single-plate transmittance (%) | Polarization degree (%) | ΔE* |
|---|---|---|---|---|---|---|---|---|---|---|---|
| 59 | HO₃S—C₆H₄— | " | OCH₃ | " | " | 6-NH—C₆H₅ | Blue | 580 | " | 98.5 | 0.8 |
| 60 | naphthalene-1,5-disulfonic acid residue | " | " | " | " | 6-NH—C₆H₅ | Blue | 585 | " | 99.0 | 0.9 |
| 61 | HO₃S—C₆H₄— | OCH₃ | " | " | " | 6-NH—C₆H₅ | Blue | 580 | " | 99.0 | 0.9 |
| 62 | naphthalene-1,5-disulfonic acid residue | " | " | " | " | 6-NH—C₆H₅ | Blue | 585 | " | 98.5 | 0.7 |

EXAMPLE 63

Ten parts of the dye of the formula (17) described in Example 1 were dissolved in 100 parts of water. After 12 parts of monoethanolamine were added, an aqueous solution of 2.6 parts of crystalline copper sulfate was added, followed by heating at 90° C. for 3 hours. Sodium chloride was added and the resultant mixture was cooled, whereby the reaction product was salted out. After the reaction mixture was stirred overnight, the reaction product was collected by filtration, washed with a 5% aqueous solution of sodium chloride and then dried, so that 9 parts of a copper complex salt dye represented by the following formula (20) were obtained.

anolamine and then 2.8 parts of copper sulfate. The mixture so obtained was heated to conduct a complexing reaction at 90°–95° C. After the completion of the reaction, sodium chloride was added so that the reaction product was salted out. The reaction product was collected by filtration and then dried, whereby 9.5 parts of a copper complex salt dye represented by the following formula (21) were obtained.

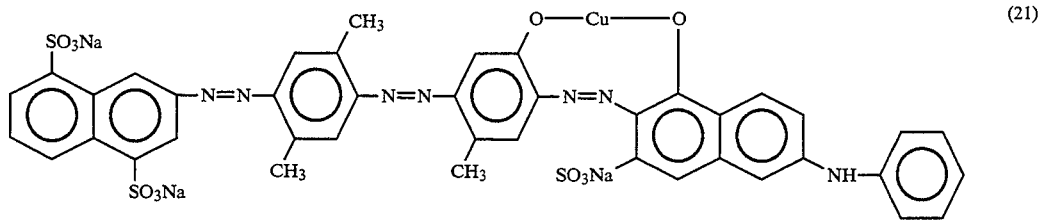
(21)

| Elemental analysis data: | C | H | N | S |
|---|---|---|---|---|
| Calculated (%) | 48.12 | 2.76 | 9.58 | 9.40 |
| Found (%) | 48.01 | 2.61 | 9.42 | 9.35 |

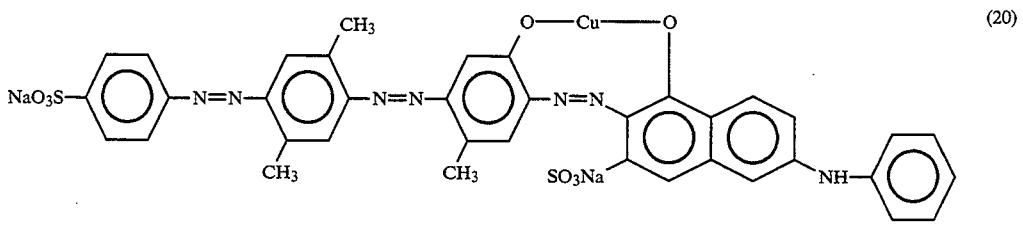
(20)

| Elemental analysis data: | C | H | N | S |
|---|---|---|---|---|
| Calculated (%) | 51.00 | 3.12 | 11.25 | 7.36 |
| Found (%) | 51.12 | 3.07 | 11.23 | 7.28 |

A polyvinyl alcohol film was treated in an aqueous solution of the dye of the formula (20) in a similar manner to Example 1, so that a polarizing film was produced. The film so obtained had a bluish purple color. The polarization degree V of the polarizing film at its maximum absorption wavelength $\lambda_{max}$ was measured. As a result, the single-plate transmittance, $\lambda_{max}$ and V were found to be 43%, 605 nm and 98%, respectively.

In a similar manner to Example 1 except that the dye of the formula (20) was used instead of the dye of the formula (17) employed in Example 1, a polarizing film having a neutral color was produced. The polarization degree of the polarizing film at 40% single-plate transmittance was 98%.

$\Delta E^*$ of the polarizing film of the neutral color was 0.9 after it had been left over for 500 hours in a 100° C.-dry constant-temperature room.

EXAMPLE 64

Ten parts of the tris-azo dye of the formula (19) described in Example 3 were dissolved in 100 parts of water, followed by the addition of 14 parts of monoeth- A polyvinyl alcohol film was treated in an aqueous solution of the dye of the formula (21) in a similar manner to Example 1, so that a polarizing film was produced. The film so obtained had a bluish purple color. The polarization degree V of the polarizing film at its maximum absorption wavelength $\lambda_{max}$ was measured. As a result, the single-plate transmittance, $\lambda_{max}$ and V were found to be 43%, 615 nm and 98%, respectively.

In a similar manner to Example 1 except that the dye of the formula (21) was used instead of the dye of the formula (17) employed in Example 1, a polarizing film having a neutral color was produced. The polarization degree of the polarizing film at 40% single-plate transmittance was 98%.

$\Delta E^*$ of the polarizing film of the neutral color was 0.9 after it had been left over for 500 hours in a 100° C.-dry constant-temperature room.

EXAMPLES 65–102

In a similar manner to Examples 63 and 64, the copper complex salt dyes shown in Table 2 were prepare using the dyes of the formula (1) as raw materials. In the table, each hue, $\lambda_{max}$ and polarization degree are those observed or measured upon production of a polarizing film by the single use of the corresponding dye, while each $\Delta E^*$ is a value upon production of a polarizing film of a neutral color by the use of the corresponding dye instead of the dye of the formula (17) in Example 1.

TABLE 2

| Example | Example number of raw material | Hue | λ max | Single-plate transmittance (%) | Polarization degree (%) | Δ E* |
|---|---|---|---|---|---|---|
| 65 | 5 | Blue | 610 | 43 | 98.0 | 0.9 |
| 66 | 8 | Greenish blue | 615 | " | 98.0 | 0.8 |
| 67 | 9 | Blue | 610 | " | 98.0 | 0.8 |
| 68 | 12 | Greenish blue | 615 | " | 98.0 | 0.9 |
| 69 | 13 | Blue | 615 | " | 98.0 | 0.9 |
| 70 | 16 | Greenish blue | 620 | " | 98.0 | 0.7 |
| 71 | 2 | " | 605 | " | 97.5 | 0.9 |
| 72 | 4 | " | 585 | " | 98.5 | 0.8 |
| 73 | 18 | " | 600 | " | 99.0 | 0.9 |
| 74 | 19 | " | 615 | " | 99.0 | 0.8 |
| 75 | 20 | " | 605 | " | 97.5 | 0.8 |
| 76 | 21 | " | 620 | " | 98.0 | 0.9 |
| 77 | 23 | Greenish blue | 625 | 43 | 98.0 | 0.8 |
| 78 | 27 | " | 605 | " | 98.0 | 0.8 |
| 79 | 6 | " | 610 | " | 98.0 | 0.9 |
| 80 | 7 | " | 590 | " | 98.0 | 0.9 |
| 81 | 28 | " | 605 | " | 98.5 | 0.7 |
| 82 | 29 | " | 620 | " | 98.0 | 0.9 |
| 83 | 30 | " | 610 | " | 98.5 | 0.8 |
| 84 | 31 | " | 625 | " | 98.0 | 0.8 |
| 85 | 33 | " | 630 | " | 98.0 | 0.9 |
| 86 | 37 | " | 610 | " | 98.5 | 0.8 |
| 87 | 10 | " | 610 | " | 98.0 | 0.9 |
| 88 | 11 | " | 590 | " | 98.0 | 0.8 |
| 89 | 38 | " | 605 | " | 98.0 | 0.8 |
| 90 | 39 | Greenish blue | 620 | 43 | 98.0 | 0.9 |
| 91 | 40 | " | 610 | " | 98.0 | 0.9 |
| 92 | 41 | " | 625 | " | 98.0 | 0.7 |
| 93 | 43 | " | 630 | " | 97.5 | 0.9 |
| 94 | 46 | " | 610 | " | 98.5 | 0.8 |
| 95 | 14 | " | 615 | " | 99.0 | 0.9 |
| 96 | 15 | " | 595 | " | 99.0 | 0.8 |
| 97 | 47 | " | 610 | " | 97.5 | 0.8 |
| 98 | 48 | " | 625 | " | 98.0 | 0.9 |
| 99 | 49 | " | 615 | " | 98.0 | 0.8 |
| 100 | 50 | " | 630 | " | 98.0 | 0.8 |
| 101 | 52 | " | 635 | " | 98.0 | 0.9 |
| 102 | 56 | " | 615 | " | 98.0 | 0.9 |

COMPARATIVE EXAMPLE 1

In a similar manner to Example 1 except that the dye synthesized in Example 1 was replaced by the dye disclosed in Example 1 of Japanese Patent Laid-Open No. 313568/1989 and represented by the following structural formula (A):

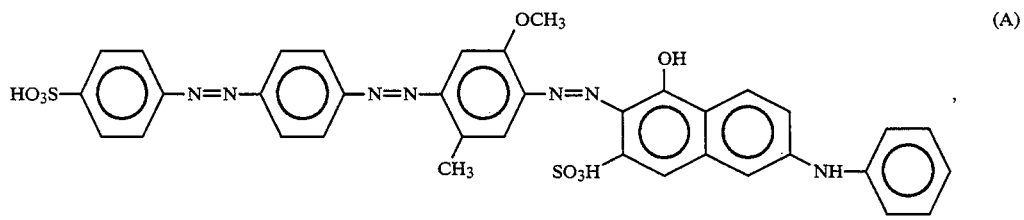

(A)

a polarizing film was produced. The polarization degree of the polarizing film at its 580 nm maximum absorption wavelength and 43% single-plate transmittance was 96%, which was inferior to those of the polarizing films obtained using the dyes of the present invention.

In a similar manner to Example 1, a polarizing film having a neutral color was also produced. The polarization degree of the polarizing film at 40% single-plate transmittance was 97%.

ΔE* of the polarizing film of the neutral color was 2.1 after it had been left over for 500 hours in a 100° C.-dry constant-temperature room, which was inferior to those of the neutral-color polarizing films obtained using the dyes of the present invention as measured in the heat-resistance tests, respectively.

COMPARATIVE EXAMPLE 2

In a similar manner to Example 1 except that the dye synthesized in Example 1 was replaced by the dye disclosed in Example 3 of Japanese Patent Laid-Open No. 12606/1991 and represented by the following structural formula (B):

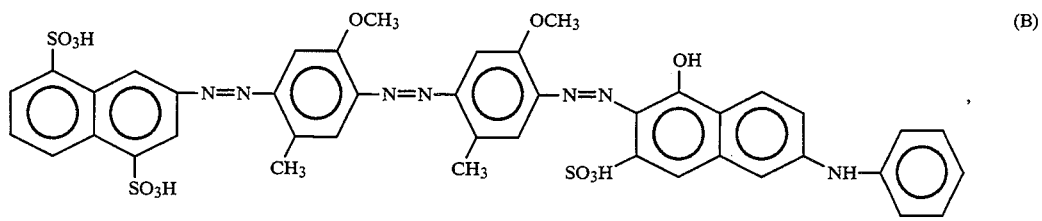
(B)

a polarizing film was produced. The polarization degree of the polarizing film at its 600 nm maximum absorption wavelength and 43% single-plate transmittance was 97%, which was inferior to those of the polarizing films obtained using the dyes of the present invention.

Similarly to Example 1, a polarizing film having a neutral color was also produced. The polarization degree of the polarizing film at 40% single-plate transmittance was 96.5%.

ΔE* of the polarizing film of the neutral color was 2.5 after it had been left over for 500 hours in a 100° C.-dry constant-temperature room, which was inferior to those of the neutral-color polarizing films obtained using the dyes of the present invention as measured in the heat-resistance tests, respectively.

What is claimed is:

1. An azo dye represented by the following formula (1):

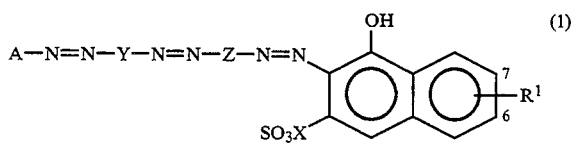

wherein A means a benzene or naphthalene ring having a sulfonic acid group or a salt thereof, Y and Z individually denote a group of the following formula (a):

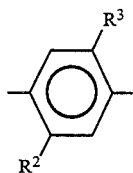

wherein $R^2$ is a hydrogen atom, a methyl group, a methoxyl group or an ethoxyl group and $R^3$ is a methyl, methoxyl or ethoxyl group, $R^1$ represents an amino, $C_{1-4}$ alkylamino, or phenylamino group bonded to the 6 or 7 position of the naphthalene ring, and X denotes a hydrogen, sodium, potassium or lithium atom, with the proviso that Y and Z are different but, when both $R^2$s are hydrogen atoms and both $R^3$s are methoxyl groups, Y and Z may be the same.

2. An azo dye of claim 1, which is represented by the following formula (2):

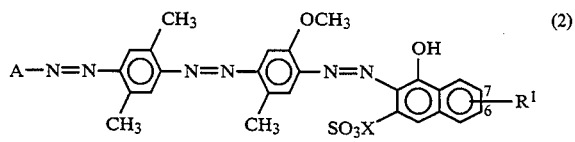

wherein A, X and $R^1$ have the same meanings as defined in the formula (1).

3. An azo dye of claim 1, which is represented by the following formula (3):

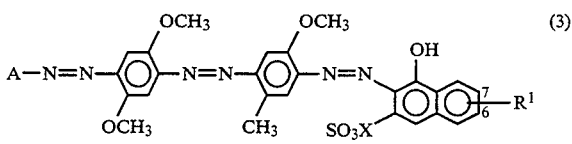

wherein A, X and $R^1$ have the same meanings as defined in the formula (1).

4. An azo dye of claim 1, which is represented by the following formula (4):

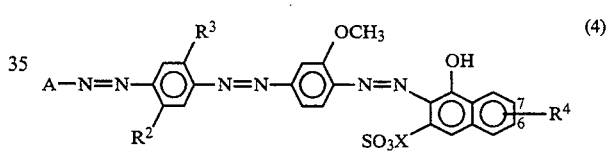

wherein A, X, $R^2$ and $R^3$ have the same meanings as defined in the formula (1), and $R^4$ represents an amino, methylamino, ethylamino, or phenylamino group bonded to the 6 or 7 position of the naphthalene ring.

5. An azo dye of claim 1, which is represented by the following formula (5):

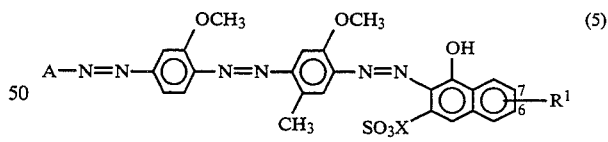

wherein A, X and $R^1$ have the same meanings as defined in the formula (1).

6. An azo dye of claim 1, which is represented by the following formula (6):

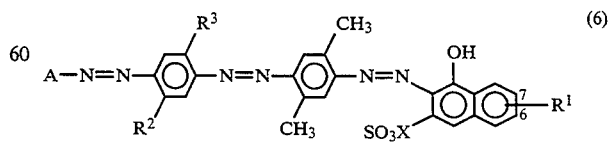

wherein A, X, $R^1$, $R^2$ and $R^3$ have the same meanings as defined in the formula (1).

7. A copper complex salt dye represented by the following formula (7):

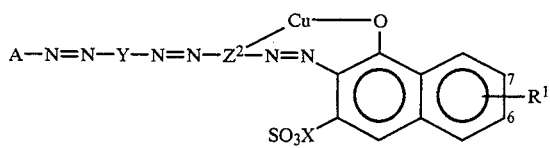

wherein A means a benzene or naphthalene ring having a sulfonic acid group or a salt thereof, Y and $Z^2$ denote groups of the following formulas (a) and (b), respectively:

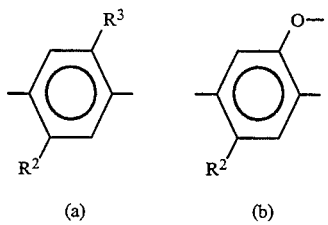

wherein $R^2$ is a hydrogen atom, a methyl group, a methoxyl group or an ethoxyl group and $R^3$ is a methyl, methoxyl or ethoxyl group, $R^1$ represents an amino, $C_{1-4}$ alkylamino, or phenylamino group bonded to the 6 or 7 position of the naphthalene ring, and X denotes a hydrogen, sodium, potassium or lithium atom.

8. A copper complex salt dye of claim 7, which is represented by the following formula (8):

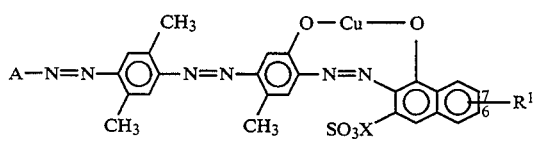

wherein A, X and $R^1$ have the same meanings as defined in the formula (7).

9. A copper complex salt dye of claim 7, which is represented by the following formula (9):

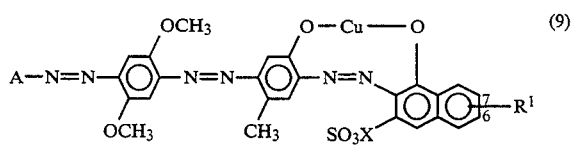

wherein A, X and $R^1$ have the same meanings as defined above in the formula (7).

10. A copper complex salt dye of claim 7, which is represented by the following formula (10):

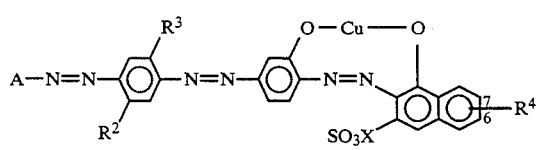

wherein A, X, $R^2$ and $R^3$ have the same meanings as defined in the formula (7), and $R^4$ represents an amino, methylamino, ethylamino, or phenylamino group bonded to the 6 or 7 position of the naphthalene ring.

11. A copper complex salt dye of claim 7, which is represented by the following formula (11):

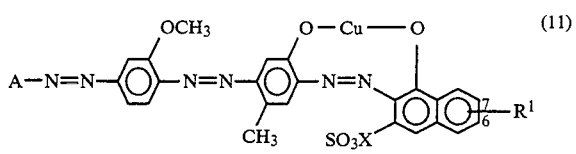

wherein A, X and $R^1$ have the same meanings as defined in the formula (7).

12. A water-soluble dye composition comprising an azo dye represented by the following formula (1) or a copper complex salt dye obtained by complexing the azo dye with copper and represented by the following formula (7):

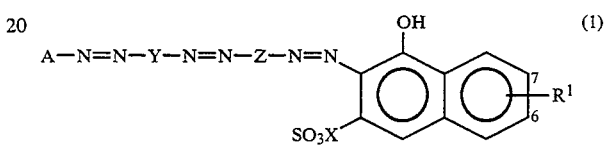

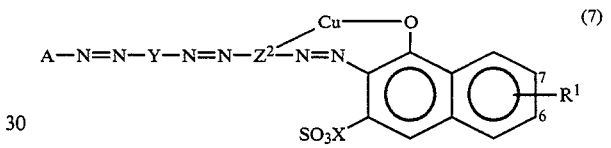

wherein A means a benzene or naphthalene ring having a sulfonic acid group or a salt thereof, Y and Z individually denote a group of the following formula (a):

and $Z^2$ denotes a group of the following formula (b):

wherein $R^2$ is a hydrogen atom, a methyl group, a methoxyl group or an ethoxyl group and $R^3$ is a methyl, methoxyl or ethoxyl group, $R^1$ represents an amino, $C_{1-4}$ alkylamino, $C_{2-4}$ alkylcarboxyamino, benzoylamino or phenylamino group bonded to the 6 or 7 position of the naphthalene ring, and X denotes a hydrogen, sodium, potassium or lithium atom, with the proviso that Y and Z are different but, when both $R^2$s are hydrogen atoms and both $R^3$s are methoxyl groups, Y and Z may be the same, and the formula (1) is not complexed with copper when $R^3$ in Z is a methyl group.

13. A water-soluble dye composition of claim 12, wherein the azo dye is represented by the following formula (2):

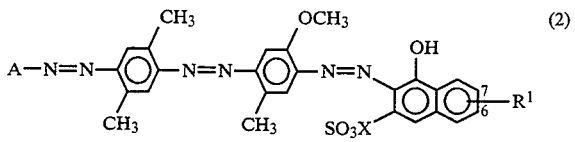

wherein A, X and $R^1$ have the same meanings as defined in the formula (1).

14. A water-soluble dye composition of claim 12, wherein the azo dye is represented by the following formula (3):

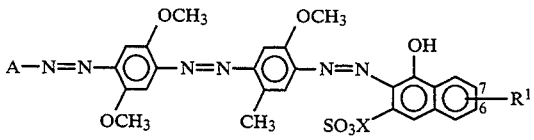

wherein A, X and $R^1$ have the same meanings as defined in the formula (1).

15. A water-soluble dye composition of claim 12, wherein the azo dye is represented by the following formula (4):

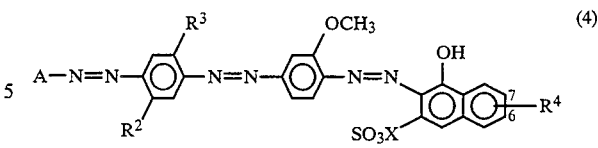

wherein A, X, $R^2$ and $R^3$ have the same meanings as defined in the formula (1), and $R^4$ represents an amino, methylamino, ethylamino, or phenylamino group bonded to the 6 or 7 position of the naphthalene ring.

16. A water-soluble dye composition of claim 12, wherein the azo dye is represented by the following formula (5):

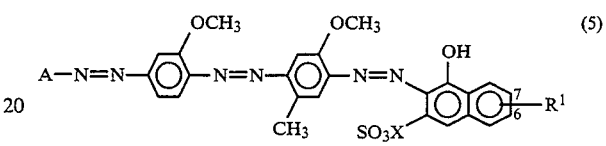

wherein A, X and $R^1$ have the same meanings as defined in the formula (1).

17. A water-soluble dye composition of claim 12, wherein the azo dye is represented by the following formula (6):

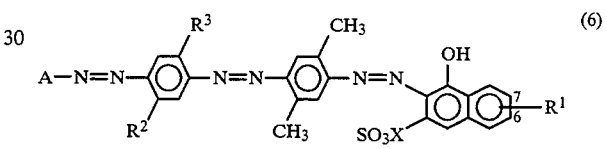

wherein A, X, $R^1$, $R^2$ and $R^3$ have the same meanings as defined in the formula (1).

* * * * *